United States Patent
Kowalski et al.

(10) Patent No.: US 10,129,114 B1
(45) Date of Patent: Nov. 13, 2018

(54) PROTOCOL EXPOSURE AS NETWORK HEALTH DETECTION

(71) Applicant: Amazon Technologies, Inc., Seattle, WA (US)

(72) Inventors: Marcin Piotr Kowalski, Western Cape (ZA); Richard Hazen Galliher, III, Seattle, WA (US); Ian Paul Nowland, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 469 days.

(21) Appl. No.: 14/673,293

(22) Filed: Mar. 30, 2015

(51) Int. Cl.
*H04L 12/26* (2006.01)
*H04L 29/06* (2006.01)

(52) U.S. Cl.
CPC .............. *H04L 43/04* (2013.01); *H04L 29/06* (2013.01); *H04L 43/16* (2013.01); *H04L 69/16* (2013.01)

(58) Field of Classification Search
CPC .......... H04L 29/06; H04L 43/16; H04L 69/16
See application file for complete search history.

(56) References Cited

U.S. PATENT DOCUMENTS

| | | | |
|---|---|---|---|
| 7,797,147 B2* | 9/2010 | Vinberg | G06F 11/3447 703/1 |
| 9,141,625 B1* | 9/2015 | Thornewell | G06F 17/30079 |
| 2006/0104288 A1* | 5/2006 | Yim | H04L 12/4633 370/395.52 |
| 2008/0155327 A1* | 6/2008 | Black | H04L 41/5012 714/27 |
| 2009/0222553 A1* | 9/2009 | Qian | H04L 12/2602 709/224 |
| 2011/0197094 A1* | 8/2011 | Wagner | G06F 11/301 714/20 |
| 2011/0282982 A1* | 11/2011 | Jain | G06F 9/5094 709/223 |
| 2014/0012981 A1* | 1/2014 | Samuell | H04L 43/0811 709/224 |
| 2015/0085665 A1* | 3/2015 | Kompella | H04L 47/2483 370/236 |
| 2015/0341376 A1* | 11/2015 | Nandy | H04L 63/1408 726/23 |
| 2016/0359872 A1* | 12/2016 | Yadav | H04L 43/04 |

* cited by examiner

*Primary Examiner* — Lashonda Jacobs
(74) *Attorney, Agent, or Firm* — Baker & Hostetler LLP

(57) ABSTRACT

Techniques for exposing network health over network connections in service provider network are disclosed. Monitors such as connection tracking modules may be configured to process network information (e.g., TCP connection state information) relating to network traffic and to transmit the network information to a health manager for analysis. As an example, a customer may request network information relating to a virtual instance provided by a service provider. In response to the request, TCP connection state information relating to the virtual instance may be extracted and processed to determine a network health condition. Information relating to the determined network health condition may be provided to the requesting customer.

20 Claims, 7 Drawing Sheets

PROTOCOL EXPOSURE AS NETWORK HEALTH DETECTION

BACKGROUND

Various computing devices are accessible over public communication networks, such as the Internet. As an increasing number of applications and services are being made available over networks such as the Internet, an increasing number of content, application, and/or service providers are turning to technologies such as cloud computing. Cloud computing, in general, is an approach to providing access to electronic resources through services, such as web services, where the hardware and/or software used to support those services is dynamically scalable to meet the needs of the services at any given time.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
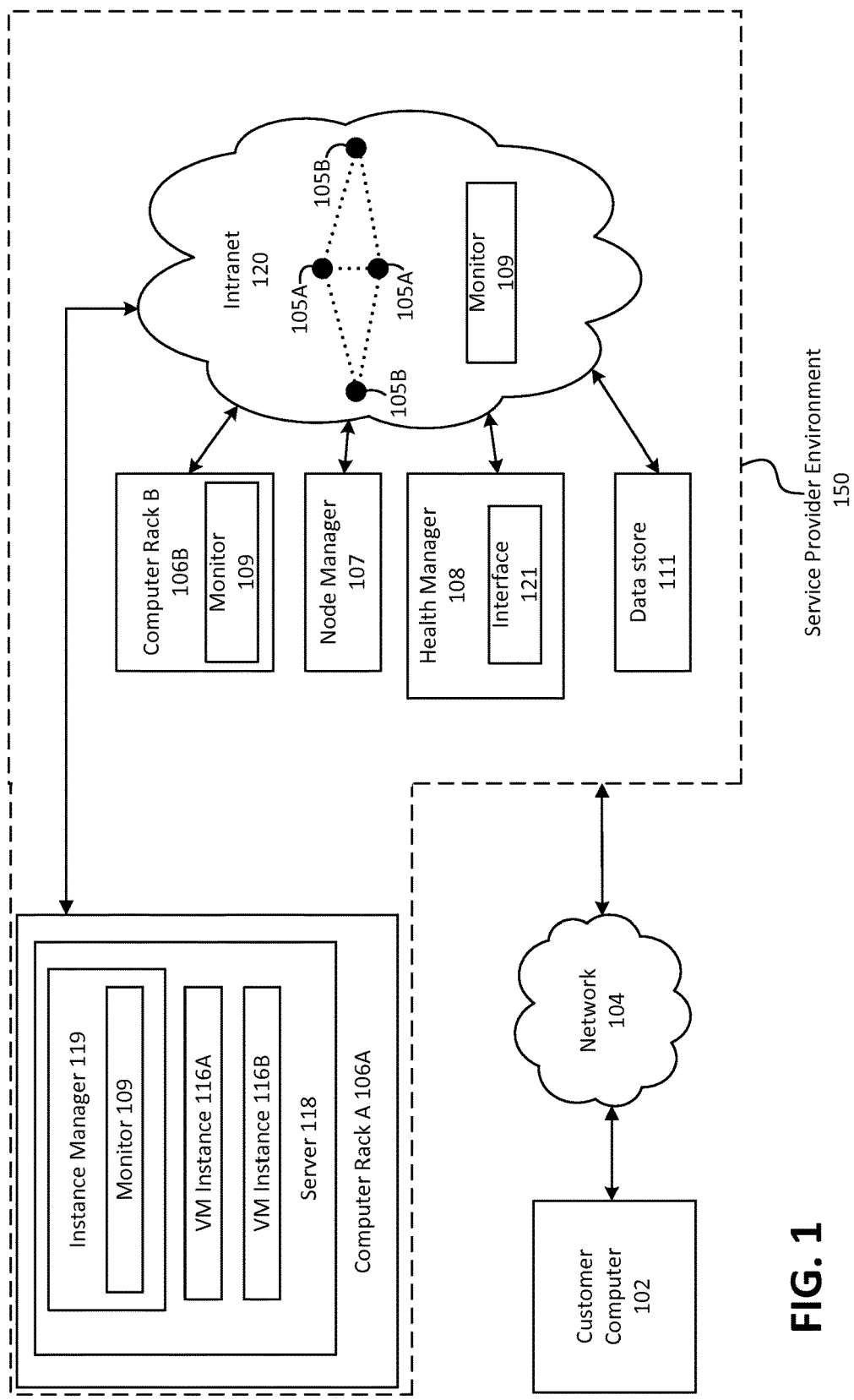
FIG. 1 depicts an example operating environment in which embodiments may be implemented.

Network architectures in datacenters, or a network of interconnected datacenters, include a plurality of network paths that interconnect computing resources such as servers. A service provider environment provides an infrastructure as a service for users of such computing resources. The users of the services of the service provider environment are sometimes referred to as customers to indicate that more than one user may use the same set of collective computing resources, e.g., as a private virtual network hosted within the service provider environment.

As a result of the significant number of servers and network paths, network reliability needs to be controlled, particularly as the complexity of such networks increases. In the presence of a disruption on one or more network paths, network latency may increase and throughput may decrease. The Transmission Control Protocol (TCP) is resilient to certain problems by leveraging mechanisms such as selective acknowledgments (ACKS), retries, and window scaling, for example. However, such mechanisms may not effectively address the cause of the problems, but may instead just address the symptoms. Moreover, because in service provider environments the details of the underlying network may be virtualized and therefore "hidden" from customers, a customer may not be able to easily determine if network problems are being caused by errors at the network layer (i.e., in the service provider network) or the application layer.

This document describes techniques for tracking TCP connection state information for nodes in a service provider environment and identifying problems in the network layer and/or application layer. A node may be or may comprise a compute node (e.g., a server) or a networking node (e.g., a router). A compute node may be a virtual machine instance or an instance that directly runs on the hardware of a server. A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes or computing nodes.

In an example embodiment, one or more servers in a service provider environment may include a monitor (e.g., a connection tracking system). The monitor may track TCP connection state information (e.g., information that indicates whether an instance is using selective ACKs, whether packets are being retransmitted, the window size, etc.) for one or more connections maintained by the server, including TCP connection state information for customer virtual machine instances hosted by the server. The monitor may be configured to extract the TCP connection state information, for example, from connection tracking tables and the like, and transmit the extracted TCP connection state information to a health manager for analysis. The health manager (e.g., a service) may process the TCP connection state information along with data from other virtual machine instances or network devices to detect network health conditions, such as issues in the network or issues with a customer's virtual machine instances. The health manager may leverage information relating to the network topology of the hosted instances and the hosting servers to classify the detected issues.

In some example embodiments, information relating to the detected health conditions may be exposed to a customer, for example, as an alert and/or via a web service application program interface (API). In certain embodiments, a customer may request tracking for one or more virtual instances. In response to the request, TCP connection state information relating to the customer's virtual instances may be extracted via the monitors and provided to the health manager. The health manager may analyze the TCP connection state information to determine whether an event has occurred. As an example, alerts may be configured to trigger upon the occurrence of certain events such as a network parameter (e.g., advertised window size, retransmissions, packet order, etc.) reaching a threshold. As such, the health manager may cause an alert to be provided to the customer, notifying the customer of the occurrence of the event.

In some example embodiments, TCP connection state information may be analyzed to determine a network health condition of a network connection between a customer's instance and another endpoint. Information representing the determined network health condition may be presented to a customer via an interface, e.g., a web service interface. The information may be used by the customer to determine whether the issue is with his or her application or relates to a network fault over the network connection. As an example, network health information that is available via the TCP connection state information may be provided to users/ developers via an application programming interface (API) in accordance with aspects this disclosure.

Figure 2:
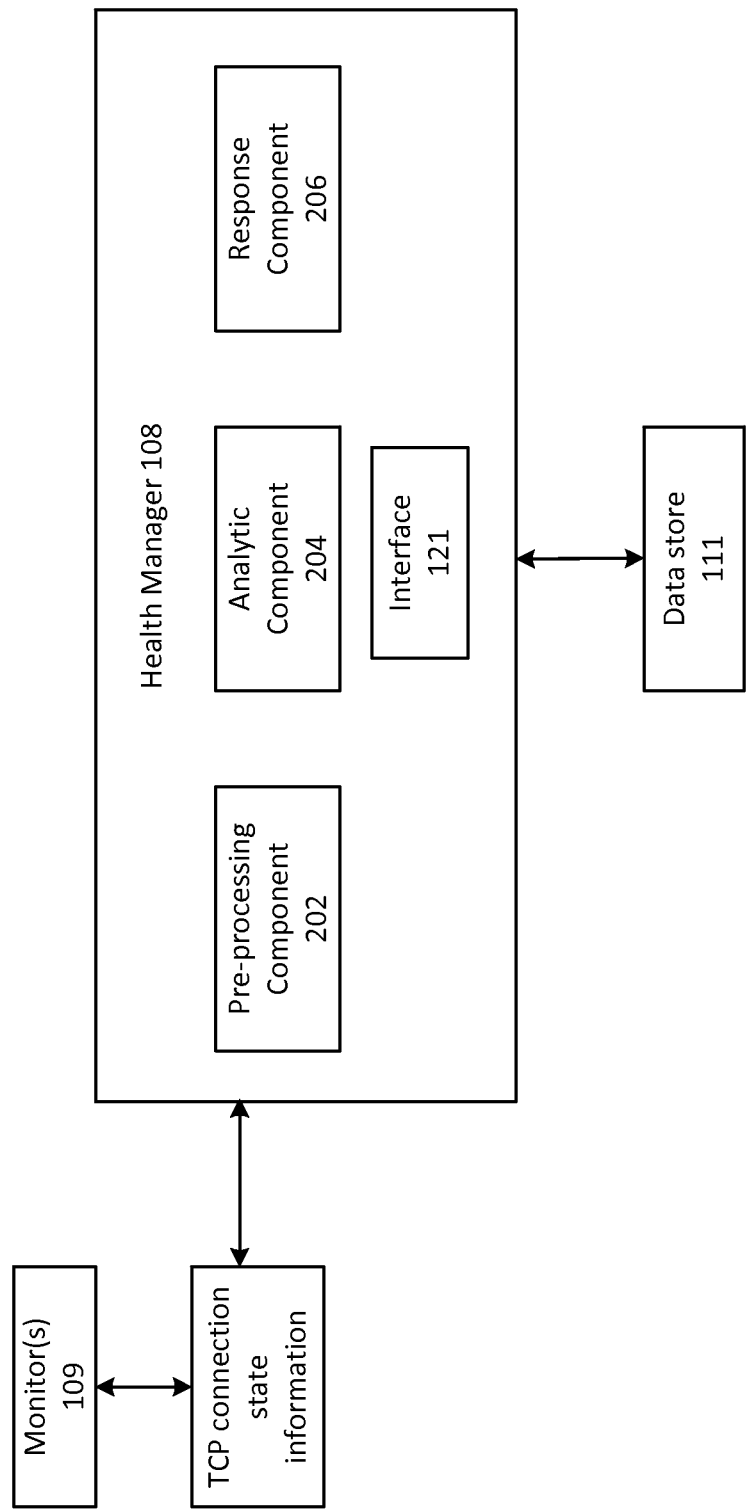
FIG. 2 depicts an example health manager that may be a part of the operating environment of FIG. 1.
Figure 3:
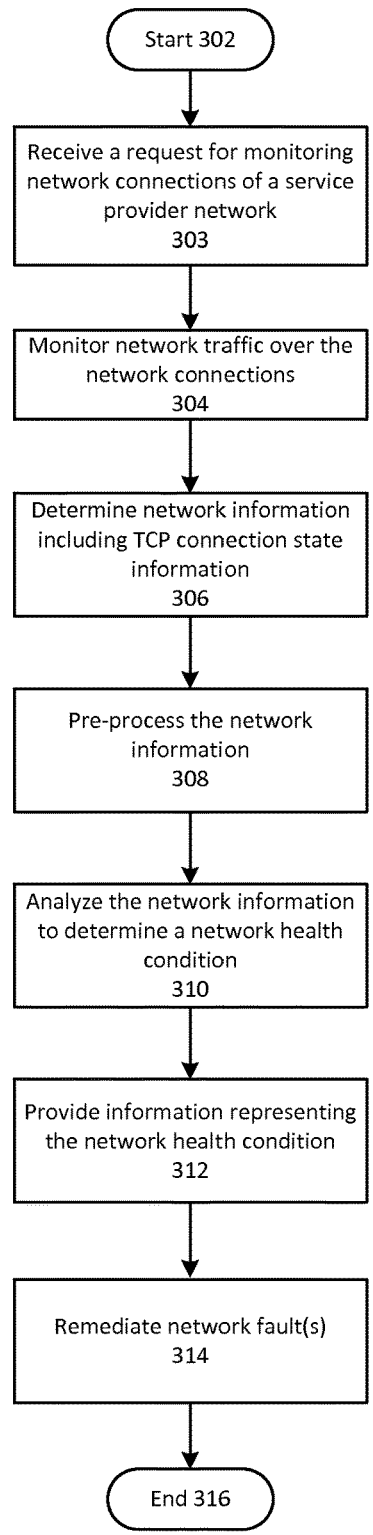
FIG. 3 depicts example operating procedures for exposing network health over one or more network connections in a datacenter.
Figure 4:
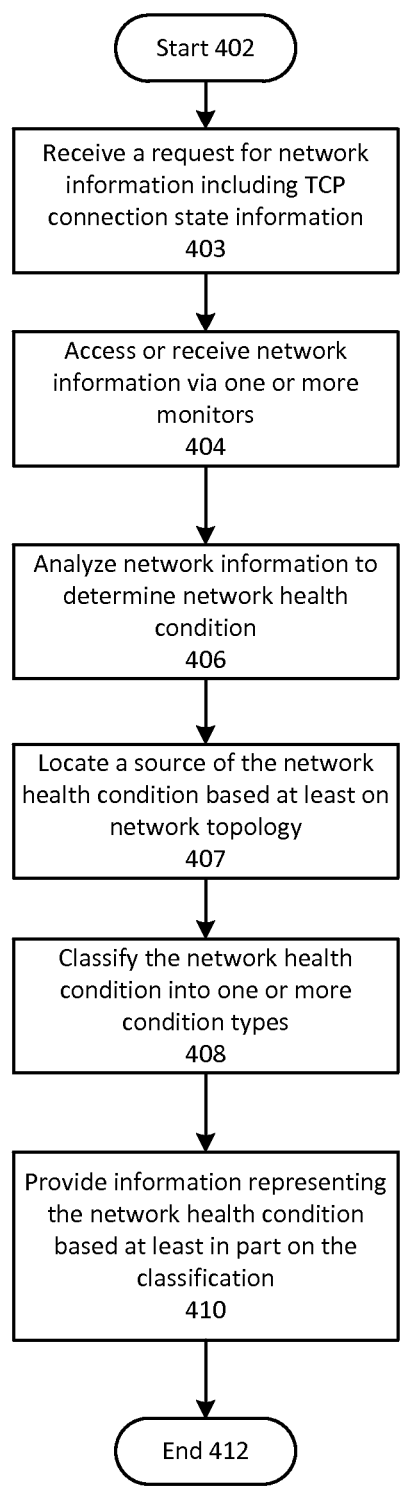
FIG. 4 depicts example operating procedures for exposing network health over one or more network connections in a datacenter.
Figure 5:
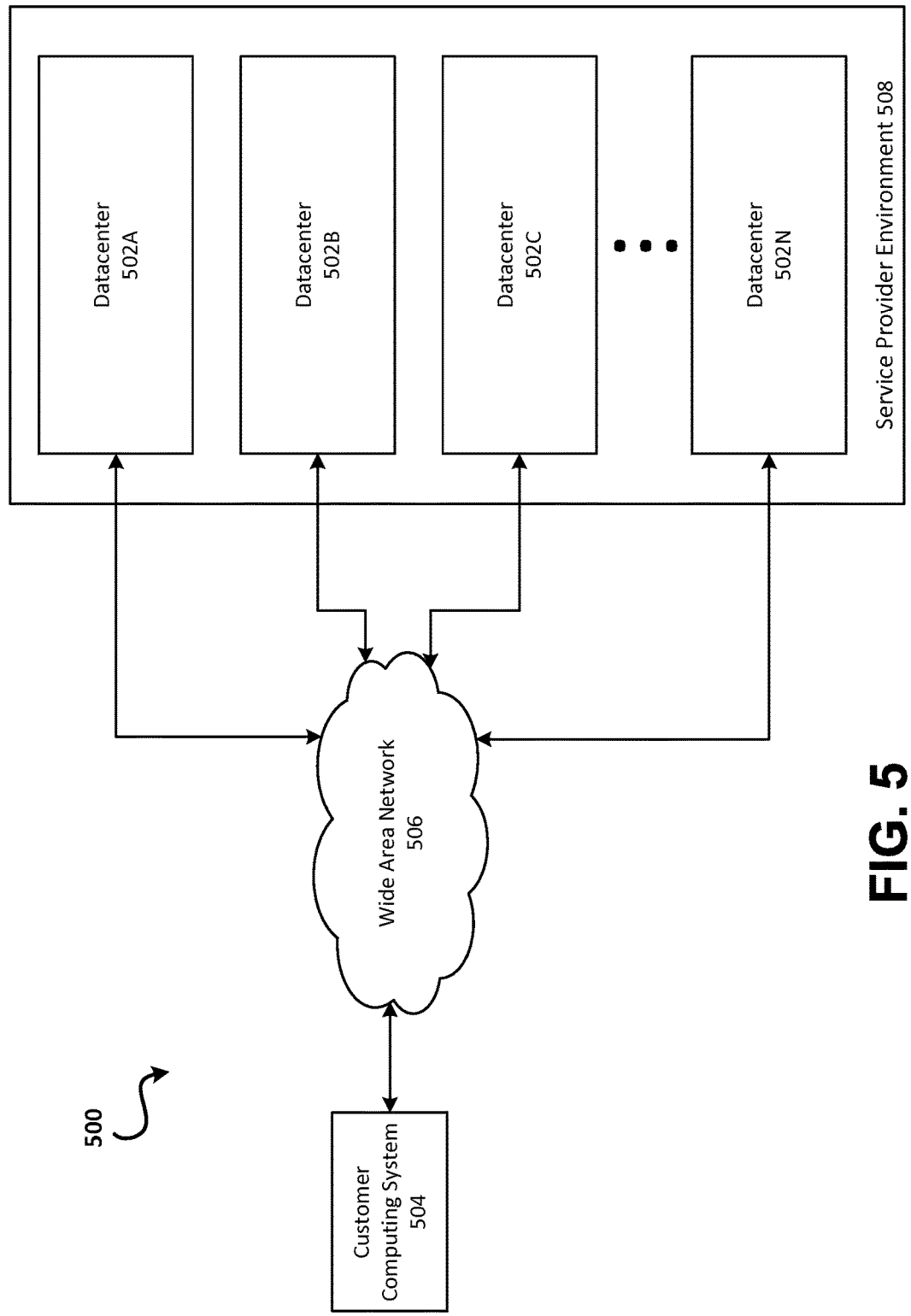
FIG. 5 depicts a service provider environment, such as in FIG. 1, that comprises a plurality of datacenters.
Figure 6:
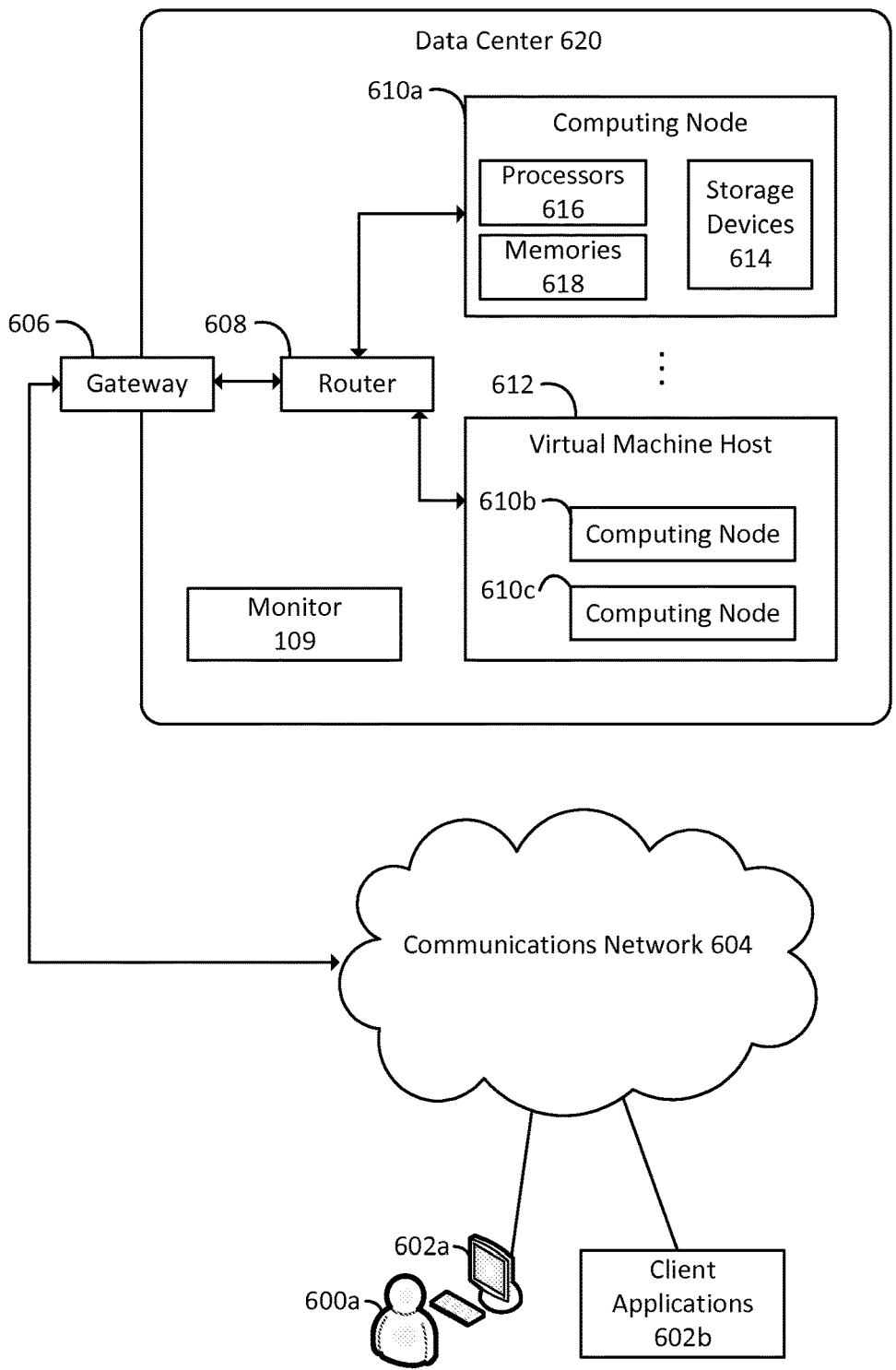
FIG. 6 depicts a datacenter, such as in FIG. 5.
Figure 7:
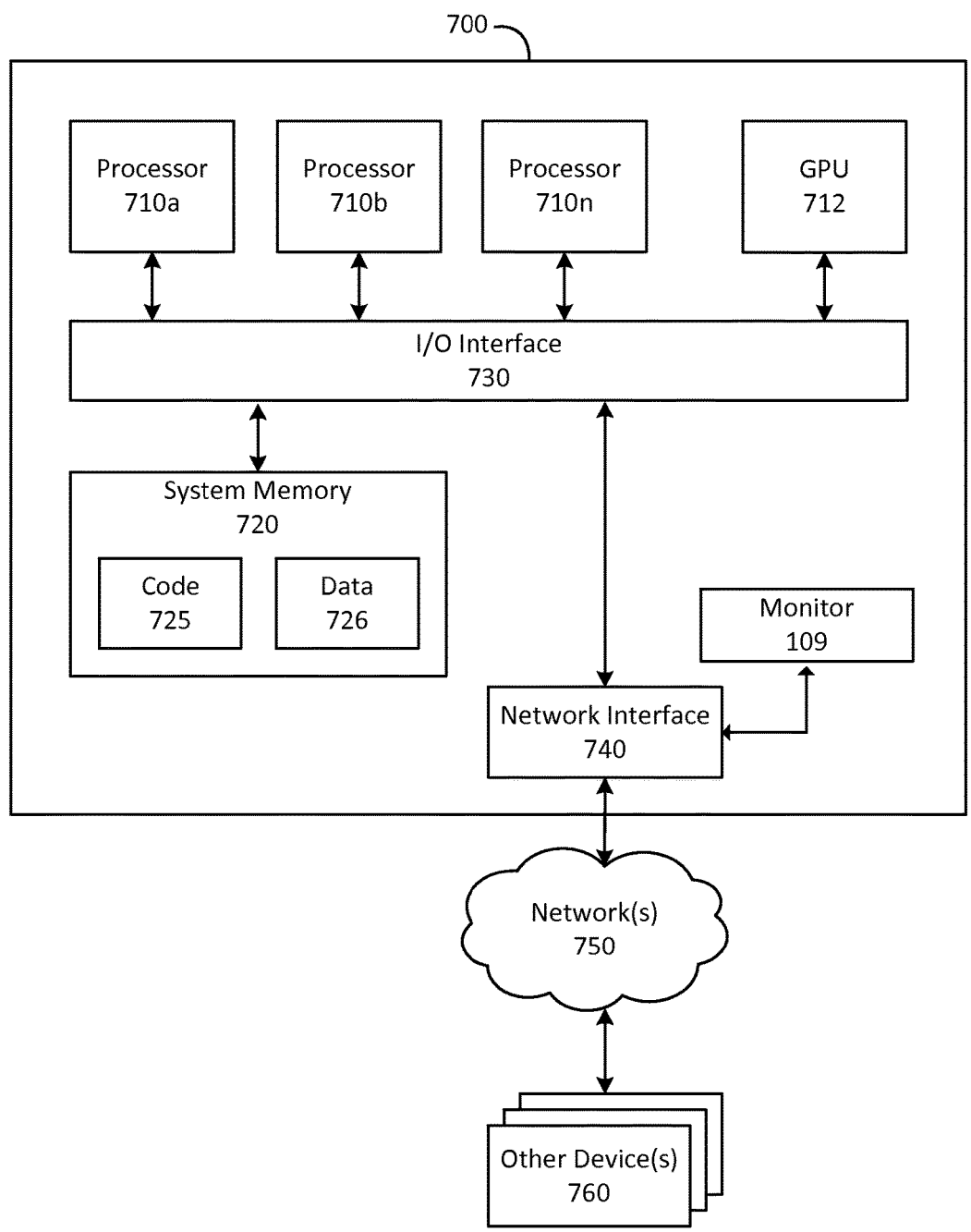
FIG. 7 depicts a computer that may be part of a datacenter, such as in FIG. 5.

Turning to the figures, FIGS. 1 and 2 illustrate example environments in which the techniques described herein may be implemented. FIGS. 3 and 4 illustrate example operating procedures that may be implemented to perform some of the described techniques. FIGS. 5-7, illustrate further detail of example environments in which the described techniques may be implemented.

FIG. 1 depicts an example service provider environment 150, which may be in communication with customer computer 102 via one or more web service APIs exposed to network 104 (e.g., the Internet). Service provider environment 150 may provide computing services to customer computer 102. Such computing services may comprise a compute service, a storage service, a relational database service, a NoSQL database service, a non-relational data storage service, a workflow service, a queue service, a notification service, and/or a content delivery service, for example.

Service provider environment 150 may communicate with various computing nodes such as those in computer rack A 106A and computer rack B 106B via a protocol such as TCP. Although this disclosure discusses TCP as an example transport-layer protocol, a person of ordinary skill in the art should recognize that the principles disclosed herein for improving performance of transport protocols also apply to other transport-layer protocols. Network nodes (e.g., routers, switches, etc.) 105 may transport traffic across a network such as intranet 120, which may involve the use of a network-layer (layer-3) protocol such as Internet Protocol (IP). As an example, network nodes 105A may be located (logically) between edge network nodes 105B. The configuration shown in FIG. 1 may be a logical rather than a physical representation, indicating merely that packets pass through network nodes 105. Various connections between network nodes 105 may be established via one or more network paths.

The components of service provider environment 150—computer rack A 106A, computer rack B 106B, node manager 107, health manager 108—may be connected to each other via a network such as intranet 120. Node manager 107 may be configured to manage the configuration (e.g., initialization, start-up, recovery, registration, removal, monitoring, etc.) of instances (e.g., virtual machine instances or instances that run directly on the hardware of a physical host computer) on servers, such as server 118. Health manager 108 may be integrated with node manager 107 or may be a distinct component. Intranet 120 may comprise networking components such as switches, routers, firewalls, and load balancers. Computer rack A 106A and computer rack B 106B may be physical racks configured to hold physical host computers, such as server 118. In turn, each physical host computer (e.g., server 118) may be configured to execute instance manager 119, which in turn may manage the operations of instances, such as virtual machine (VM) instances 116A, 116B. These VM instances 116A, 116B may execute on behalf of customer computer 102 (or another entity) to provide compute services to customer computer 102.

Health manager 108 may be in communication with one or more computing nodes and/or network nodes that effect the communication links between two or more computing nodes. Health manager 108 may be configured to receive or access information relating to the one or more computing nodes such as TCP connection state information (e.g., information that indicates whether an instance is using selective ACKs, whether packets are being retransmitted, the advertised window size, etc.). Health manager 108 may be configured to receive a data dump of information and/or may be configured to process the received or accessed TCP connection state information to filter at least a portion of the received or accessed information. Health manager 108 may be configured to analyze the received TCP connection state information. For example, health manager 108 may communicate with network nodes such as routers and switches to receive information relating to network topology, information mapping customer instances to the hosting servers, and/or physical network health. As an example, determination of such physical network health may be implemented based on the systems and methods disclosed in U.S. Pat. No. 8,661,295, hereby incorporated herein by reference in its entirety. Other network information may be received or accessed by the health manager 108.

Data store 111 may be in communication with one or more of the components of service provider environment 150 via a network such as intranet 120. Data store 111 may be configured to store information received from the components of service provider environment 150 such as one or more monitors 109 and/or health manager 108, for example. Data store 111 may be configured to store network information, collected or generated by health manager 108 or other component, such as TCP connection state information, network topology information, physical network health information, and information mapping customer VM instances 116A, 116B to hosting servers 118, for example. Other information such as the results of an analysis conducted via health manager 108 may also be stored via data store 111. As a further example, the information stored in data store 111 may be made available (e.g., provided, presented to, accessible by, etc.) to one or more computing nodes, such as customer computer 102, computer racks 106A, 106B, and/or virtual machine instances 116, via interface 121 (e.g., application programming interface (API)).

Monitors 109 may be in communication with one or more computing nodes. Monitors 109 may be configured to operate locally on the one or more computing nodes or may operate remotely relative to the computing nodes. Monitors 109 may be configured to receive or access information relating to the one or more computing nodes, such as TCP connection state information. Monitors 109 may be configured to receive a data dump of information and/or may be configured to process the received or accessed data to filter at least a portion of the received or accessed data. In certain embodiments, monitors 109 may be configured to collect TCP connection state information at an edge of a network.

In embodiments, monitors 109 may be configured to extract the TCP information from connection tracking tables, for example, and to transmit the extracted TCP information to health manager 108. As an example, monitors 109 may be configured to extract and transmit TCP connection state information for every connection associated with health manager 108. As another example, monitors 109 may be configured to extract and transmit TCP connection state information for connections associated with customers that have enabled the tracking feature (e.g., implemented via health manager 108). As another example, one or more of monitors 109 may be configured to extract and transmit TCP connection state information for a random set of connections. As a further example, one or more of monitors 109 may be configured to extract and/or transmit TCP connection state information relating to connections in response to the detection of a trigger condition (e.g., duplicate packets, selective ACKs, window size collapse, etc.).

Monitors 109 may be configured to run on network nodes and/or in the instance managers such as instance manager 119. As an example, a monitor 109 running in instance manager 119 (e.g., hypervisor) may be configured to track connection states for the instances (e.g., VM instances 116A, 116B) hosted by instance manager 119. As such, monitor 109 may extract TCP connection state information for one or more connections relating to the instances and may generate a message to transmit the extracted information. As an example, for each connection, the message may include TCP connection state information, an identifier of the instance, and other data (e.g., a machine image identifier, instance type identifier, host identifier, etc.) that could be used to detect patterns. As a further example, monitor 109 may transmit a request via an API to health manager 108, where the request includes the generated message.

Health manager 108 may receive the message (e.g., API request) and may store the data in data store 111. As an example, health manager 108 may aggregate information (e.g., TCP connection state information) received from the one or more monitors 109. Such aggregation may include contextual information such as service policies, historical data, source of the data, and network topology, for example. In addition, health manager 108 may execute a process to analyze the TCP connection state information to determine patterns and/or indicators of a network health condition including issues relating to the network. For example, health manager 108 may analyze TCP connection state information indicating duplicate packets are being sent, selective ACKs are being sent, packet window sizes are shrinking, etc. Health manager 108 may be configured to analyze the TCP connection state information across various dimensions, including per customer, per rack, per instance, per instance type, and the like. As another example, machine learning algorithms may be trained and tested on TCP connection state information received via health manager 108 to generate predictors associated with certain classifications of data such as fault conditions (e.g., application fault condition, transport fault condition, etc.). As such, the trained machine learning algorithm may be configured to classify subsequently received data based on the predictors to identify normal conditions and/or fault conditions represented by the subsequently received data. As a further example, heuristics may be used to develop one or more predictors of a fault condition and subsequently received data may be compared to the one or more predictors to determine a fault condition.

In an embodiment, health manager 108 may be configured to track all or a portion of the TCP connection state information generated by virtual machine instances 116A, 116B. For example, health manager 108 may be configured via policy (e.g., specified by the customer, specified by administrators of service provider environment 150, etc.) to control the conditions by which monitors 109 are enabled to track TCP connection state information. As another example, a system configuration may be set that causes health manager 108 to select a subset of monitors 109 and to enable the subset of monitors 109 to track TCP connection state information for a period of time and then enable a different subset of monitors 109 to track TCP connection state information. Such enabling/disabling may be a batch process controlling a group of monitors 109 and may be sequenced or randomized. Health manager 108 may enable a certain set of monitors 109 to track TCP connection state information based on specific customer requests or configuration from an administrator. For example, as described above, health manager 108 may be configured to analyze customer traffic in response to requests from the customer or an administrator that is trying to identify or confirm an issue with a customer's instances.

In an embodiment, health manager 108 may randomly select a number of monitors 109 and may enable monitors 109 to track TCP connection state information. In another embodiment, the selective enabling of monitors 109 to track TCP connection state information may be ordered and deliberate. For example, health manager 108 may access or receive information representing the network topology of service provider environment 150 and monitors 109. As such, health manager 108 may enable selected monitors 109 based on a diagnostic pattern over the network topology to aide in the diagnosis of a widespread issue (e.g., transport fault). As an example, health manager 108 may selectively enable certain monitors 109 based on customer, rack, server, instance type, physical location, time of day, and/or other parameters. By enabling certain monitors 109 across the network topology, health manager 108 may determine whether any detected network issues are localized or whether such issues are affecting various network components.

Health manager 108 may enable monitors 109 in response to triggers or events such as the detection of duplicate packets, selective ACKs, locally shrinking packet window sizes, and the like. In this case, health manager 108 may be configured to process the TCP connection state information in service provider environment 150. For example, health manager 108 may use a stream processor, such as AWS Kinesis, to process the messages including the TCP connection state information that are received from monitors 109. Health manager 108 may be configured to process the messages to detect events represented by the TCP connection state information such as duplicate packets being sent, selective ACKs, locally shrinking packet window sizes, and the like. In response to detecting such events in the TCP connection state information, health manager 108 may analyze other connections to look for issues experienced on other connections.

If a potential issue is detected, health manager 108 may locate and diagnose the issue. This may include using information (e.g., network typology) from node manager 107 and/or received via the messages from monitors 109. Such information may identify the customer's virtual instances, the servers hosting the instances, and/or the network nodes in the path of the connections relating to the instances. Leveraging information relating to the source of the TCP connection state information and the network topology, health manager 108 may compare TCP connection state information across various customers, racks, servers, and/or instances to determine if a widespread issue is affecting the network. Such a widespread issue may be referred to as a transport fault. For example, if multiple connections for instances being hosted by the same server are affected, health manage 108 may determine that the network issue is a transport fault relating to the server or a network component of the rack. In some example embodiments, the analysis may extend to other servers 118 within service provider environment 150. For example, if a connection endpoint has an IP address in service provider environment 150, a similar analysis may be implemented at the destination node.

If, however, health manager 108 determines that the detected issue is isolated to a connection or connections for a particular instance, health manager 108 may diagnosis such an issue as an application fault. Such an application fault may relate to a customer's particular virtual instance and my not affect the connections of the other instances hosted by the same server. Health manager 108 may process the received TCP connection state information to determine patterns of connection traffic and may identify outliers in the patterns. Machine learning or other data processing algorithms may be used to classify data relating to connection traffic as normal traffic behavior. For example, detection of retransmits or a decrease in advertised window size may be classified as a normal, non-fault condition based on a comparison to historical connection traffic. However, a certain number of retransmits exceeding a determined threshold, or a sharp decrease in advertised window may be classified as an outlier to the normal, non-fault condition. Such outliers may be represented of a particular transport fault or application fault and may be used to identify subsequent issues, for example, using heuristics. As such, learned patterns may be stored and used as references by health manager 108 in diagnosing network issues.

When a network issue is detected and diagnosed, health manager 108 may generate one or more messages to report such detections and/or diagnosis. For example, health manager 108 may generate an alert to investigate the part of the network that has been identified as the source or potential source of the issue. For example, a trouble ticket may be generated indicating where the problem is identified and a technician may be deployed to investigate. An alert may also be transmitted to a customer to notify the customer of the issue with the network. If the network issue has been diagnosed as an application fault, an alert may be transmitted to a particular customer to notify the customer that there may be an issue within one or more of the customer's instances. As an example, customers may set thresholds and alarms for their virtual instances, where health manager 108 analyzes TCP connection state information and generates alarms based on the customer thresholds, alarms, and/or rules.

FIG. 2 depicts an example operating environment in which aspects may be implemented. As shown, FIG. 2 depicts an example health manager 108. Health manager 108 may comprise pre-processing component 202, analytic component 204, and response component 206. Other components may be include and may be distributed in various locations and implementations. Health manager 108 may be configured to receive data from monitors 109, node manager 107, and/or data store 111. Pre-processing component 202 may be configured to receive a data dump of information and/or may be configured to process the received or accessed data to filter at least a portion of the received or accessed data. As an example, pre-processing component 202 may be configured to aggregate TCP connection state information from various sources or over various time frames. As another example, TCP connection state information relating to network traffic over a plurality of connections may be aggregated. As a further example, TCP connection state information relating to network traffic over a single connection, but from various time periods, may be aggregated. Pre-processing component 202 may be configured to overlay (e.g., correlate, associate, aggregate, etc.) the TCP connection state information with supplemental information such as simple network management protocol (SNMP) data from one or more computing nodes, octets, packet-in/out, loss, and/or data from latency probes. Other pre-processing may be used.

Analytic component 204 may be configured to access or receive data, for example, from pre-processing component 202 or other data source and, in an example embodiment, pre-processing component 202 may be implemented using a stream processor. Analytic component 204 may be configured to analyze the received data, for example, TCP connection state information. As an example, analytic component 204 may be configured to analyze TCP connection state information to determine a network health condition. The network health condition may comprise at least one of an advertised window below a predetermined threshold, a detection of a retransmit over a network connection, and a number of retransmits over a network connection exceeding a predetermined threshold. The network health condition may comprise events indicative of one or more of an application fault and a transport fault.

Analytic component 204 may receive and process the TCP connection state information, an identifier of the instance, and other data (e.g., a machine image identifier, instance type identifier, host identifier, etc.) that could be used to detect patterns. Analytic component 204 may execute a process to analyze the TCP connection state information to determine patterns and/or indicators of the network health condition. Analytic component 204 may be configured to analyze the TCP connection state information across various dimensions, including per customer, per rack, per instance, per instance type, and the like.

The network health condition determined by analytic component 204 may represent a network issue such as a transport fault or an application fault. Leveraging information relating to the source of the TCP connection state information representing the detect issue and the network topology, analytic component 204 may compare TCP connection state information from one source to TCP connection state information relating to other sources such as racks, servers, and/or instances.

If TCP connection state information from multiple sources represents similar network issues, analytic component 204 may determine that a widespread issue (e.g., transport fault) is affecting the network. For example, if multiple connections for instances being hosted by the same server are affected, analytic component 204 may determine that the network issue is a transport fault relating to the server or a network component of the rack.

If, however, analytic component 204 determines from the processed TCP connection state information that the detected issue is isolated to a connection or connections for a particular instance, analytic component 204 may diagnosis such an issue as an application fault. Such an application fault may relate to a customer's particular virtual instance and my not affect the connections of the other instances hosted by the same server.

Analytic component 204 may be configured to classify the network health condition based at least upon one or more condition types, such as, application fault condition, transport fault condition, path maximum transmission unit (MTU) discovery, and/or application layer overload, for example. Analytic component 204 may be configured to analyze and/or classify TCP connection state information based on varying scales, such as, per-host, per-connection, per-path, and/or per-link, for example. Contextual information such as source address, destination address, round-trip-time, and other network (packet) information may be used in analyzing and/or classifying TCP connection state information. As an example, analytic component 204 may process the received TCP connection state information relating to various servers to determine patterns of connection traffic and may identify outliers in the patterns. Machine learning or other data processing algorithms may be used to classify data relating to connection traffic as normal traffic behavior. For example, detection of retransmits or a decrease in advertised window size may be classified as a normal, non-fault condition based on a comparison to historical connection traffic. However, a certain number of retransmits exceeding a determined threshold, or a sharp decrease in advertised window may be classified as an outlier to the normal, non-fault condition. The outliers may be representative of a particular transport fault or application fault and may be used to identify subsequent issues by, for example, using heuristics. As such, learned patterns may be stored and used as references by analytic component 204 in diagnosing and classifying the network health condition.

Based on at least the determination and/or classification of the network health condition, response component 206 may be configured to implement remediation actions. Remediation may comprise, for example, one or more of causing the network traffic to be throttled, cause the network traffic to be blocked, transmitting a notification (e.g., event ticket), causing a traffic to be redirected within the service provider network, or causing scaling network resources such as scalable datacenter resources. Response component 206 may implement remediation using other components such as node manager 107. Response component 206 may generate an alert to investigate the part of the network that has been identified as the source or potential source of the issue. For example, a trouble ticket may be generated and a technician may be deployed to investigate. An alert may also be transmitted to a customer to notify the customer of the issue with the network. If the network issue has been diagnosed as an application fault, an alert may be transmitted to a particular customer to notify the customer that there may be an issue within one or more of the customer's instances. As an example, customers may set thresholds and alarms for their instances, where analytic component 204 analyzes TCP connection state information and response component 206 generates alerts based on the customer thresholds, alarms, and/or rules. Such rules and thresholds may be specified by the customer or by administrators of service provider environment 150 to control the conditions by which the health manager 108 determines a network health condition. For example, alerts may be configured to trigger upon the occurrence of certain events such as a network parameter (e.g., advertised window size and retransmissions) reaching a threshold.

Response component 206 may provide information relating to network health to one or more computing nodes via an interface such as interface 121 (e.g., an API). As an example, an API may be leveraged to open a socket and provide a handler when an advertised windows size falls below a predetermined threshold (e.g., 100 KB). As a further example, a handler may be established when a retransmit is detected on a particular connection. This handler may extract TCP connection state information, which can, in turn, facilitate improved reasoning to disambiguate between network conditions such as a transport fault versus an application fault. The TCP connection state information may be used with long lived connections, whereby a decreased window size may be detected and a different connection may be established in response to the decreased window.

FIG. 3 depicts example operating procedures for exposing network health over one or more network connections, such as network 104 and/or intranet 120 relating to the service provider environment of FIG. 1. In some embodiments, the operating procedures of FIG. 3 may be implemented by node manager 107 and or health manager 108 of FIG. 1 to analyze network traffic of one or more computing nodes to expose network health information such as TCP connection state information. It may be appreciated that there are embodiments that do not implement all of the operating procedures, implement additional operative procedures, or implement the depicted operating procedures in a different order than is depicted in FIG. 3.

Operation 303 depicts receiving or accessing a request for monitoring, for example, network connections relating to one or more virtual instances of a service provider network. The request may be received and processed by a service provider environment, for example, health manager 108 of the service provider environment 150. The request for monitoring may relate to monitoring one or more computing nodes of a service provider environment (e.g., network). For example, the service provider may include one or more datacenters with one or more instances that may communicate with each other over private and/or public network connections. As a further example, referring to FIG. 1, the request for monitoring may be received from customer computer 102 and may relate to monitoring one or more of VM instances 116A, 116B.

Operation 304 depicts monitoring network traffic, for example, in response to the received request for monitoring. Monitoring may comprise receiving or accessing information relating to a network comprising one or more computing nodes of the service provider environment. As an example, referring to FIG. 1, monitors 109 may include or be associated with a connection tracking system running in an instance manager such as instance manager 119. Monitors 109 may analyze the network traffic sent between the computing nodes over one or more network connections and may extract TCP connection state information. The extracted TCP connection state information may be transmitted to health manager 108, for example, using one or more APIs. In certain embodiments, monitors 109 may compress the TCP connection state information and may transmit a message to health manager 108. The message may identify the server and/or the instance for each set of TCP connection state information.

As a further example, monitors 109 may be configured to extract operational parameters of one or more computing nodes such as an occupancy of the computing node, an instance size, a processing utilization, and a processing load. Monitors 109 may be configured to identify the underlying protocol and/or the type of traffic (e.g., HTTP web-traffic, email, VoIP, streaming video, application layer to database communication, and/or database server to storage fabric communication). In an example embodiment, referring to FIG. 1, monitors 109 may be implemented as a module that runs on a hypervisor or Dom0 such as instance manager 119. As such, when a virtual machine hosted by the instance manager sends or receives a data packet, TCP connection state information relating the transmission of the packet may be accessed by monitors 109 and sent to health manager 108. In an embodiment, monitors 109 may parse the packet and create a digest identifying the TCP connection state information.

Operation 306 depicts determining TCP connection state information based on the monitored network traffic. TCP connection state information may comprise various parameters representing at least a feature of the network traffic. As an example, TCP connection state information may comprise at least one of at least one of an advertised window information and retransmission information. As another example, the TCP connection state information may comprise one or more of average packet size, average time gap between packets, a ratio of inbound to outbound packets, TCP flag ratio, flag count, number of source/destination ports, ratio of inbound to outbound bytes, and type of protocol used. In an example embodiment, referring to FIG. 1, monitors 109 may track the network traffic of one or more network connections to extract particular TCP connection state information. As a further example, monitors 109 may be configured to transmit the extracted information to health manager 108 for processing.

Operation 308 depicts pre-processing the TCP connection state information. Pre-processing may comprise filtering at least a portion of the received or accessed TCP connection state information. As an example, pre-processing may comprise aggregating TCP connection state information from various sources (e.g., connections) or over various time frames. As another example, TCP connection state information relating to network traffic over a plurality of connections may be aggregated. As a further example, TCP connection state information relating to network traffic over a single connection, but from various time periods, may be aggregated. The pre-processing may comprise overlaying (e.g., correlating, associating, aggregating, etc.) the TCP connection state information with supplemental information such as simple network management protocol (SNMP) data from one or more computing nodes, octets, packet-in/out, loss, and/or data from latency probes. Other pre-processing may be used. In an example embodiment, referring to FIG. 1, monitors 109 may provide information to health manager 108 for pre-processing.

Operation 310 depicts analyzing the TCP connection state information to determine a network health condition, for example, of one or more network connections. For example, the network health condition may comprise at least one of an advertised window below a predetermined threshold, a detection of a retransmit over a network connection, and a number of retransmits over a network connection exceeding a predetermined threshold. The analyzing may include classifying the network health condition into one or more condition types such as an application fault and a transport fault.

In an example embodiment, referring to FIG. 1, health manager 108 may be configured to process the received information against preset rules, thresholds, aggregate information, and the like. Such rules and thresholds may be specified by the customer or by administrators of service provider environment 150 to control the conditions by which the health manager 108 determines a network health condition. For example, alerts may be configured to trigger upon the occurrence of certain events such as a network parameter (e.g., advertised window size and retransmissions) reaching a threshold or deviating from the average or a percentile by more than a certain percentage. As such, health manager 108 may receive the TCP connection state information and compare the TCP connection state information to the established thresholds or patterns to determine if an alert has been triggered.

Patterns in network traffic may be determined heuristically based upon aggregate information, such as the aggregated information described in operation 308. The health manager may process TCP connection state information over a period of time and may compare TCP connection state information received from various sources to identify a pattern of network traffic that represents a particular network health condition. Health conditions may be determined per connection, per instance, per server, per rack, per customer, or other singular or aggregate classification. As an example, multiple virtual instances hosted across various servers may experience a similar retransmission issue. As such, health manager 108 may identify such a pattern of widespread retransmission as a transport fault of the network that requires remediation. As a further example, the TCP connection state information may be processed by health manager 108 along with operational parameters of the node, such as occupancy of the instance, an instance size, a processing utilization, and/or a processing load, to determine whether a fault is network related (e.g., transport fault) or application related (e.g., application fault). Rules may be established to classify certain patterns represented by the TCP connection state information and/or operational such as distinguishing a localized retransmission issue due to an operational fault in a particular instance over a widespread reduction in advertised window size across various computing nodes on the network due to a network path issue.

In certain aspects, health manager 108 may locate a source of the network health condition. For example, the health manager may use information relating to network typology to identify a source of the determined network health condition. Such network topology information may identify the customer's instances (e.g., instance identifier), the servers hosting the instances (e.g., host identifier), and/or the network nodes in the path of the connections relating to the instances (e.g., network device identifier). Leveraging information relating to the source of the TCP connection state information and the network topology, health manager 108 may compare TCP connection state information across various customers, racks, servers, and/or instances to determine if a widespread issue is affecting the network or if the issue is localized to a particular customer or instance.

Operation 312 depicts providing (e.g., transmitting, presenting, etc.) information representing the determined network health condition. The information may be provided via an interface such as an API. As an example, the information may be presented to facilitate diagnosis of a network fault, for example, over one or more network connections. As an example, one or more computing nodes may receive or access the network health information. In an example embodiment, referring to FIG. 1, health manager 108 may be configured to provide the determined network health condition to a source of the request received in operation 303.

Operation 314 depicts remediating one or more network faults. Remediation may be based at least in part on the information representing the determined network health condition. As an example, one or more of an application fault and a transport fault may be remediated. Remediation may comprise one or more of throttling the network traffic, blocking the network traffic, transmitting a notification, redefining a path associated with the first network connection, and scaling resource of the datacenter. In an example embodiment, referring to FIG. 1, node manager 107 may reconfigure network connections between VM instances 116 and/or between data centers and may adjust traffic flow via intranet 120. Further, node manager 107 may address application faults by initiating or removing VM instances 116, as needed, and scaling other resources of the datacenter. In an embodiment, a trouble report may be generated in service provider environment 150, datacenter, rack, and/or server where the problem is identified and a technician may be deployed to investigate. An alert may also be transmitted to a customer to notify the customer of the issue with the network. In the example embodiment of FIG. 3, the procedure ends at 316.

FIG. 4 depicts example operating procedures for exposing network health information, such as the web services platform of FIG. 1. In some embodiments, the operating procedures of FIG. 4 may be implemented by node manager 107 and/or health manager 108 of FIG. 1 to analyze network traffic and operational parameters of one or more computing nodes to identify network health. It may be appreciated that there are embodiments that do not implement all of the operating procedures, implement additional operating procedures, or implement the depicted operating procedures in a different order than is depicted in FIG. 4.

Operation 403 depicts receiving or accessing a request for TCP connection state information. The request may be received and processed by a service provider. The request for TCP connection state information may relate to monitoring one or more computing nodes of a service provider environment (e.g., network). For example, the service provider may include one or more datacenters with one or more VM instances that may communicate with each other over private and/or public network connections. As a further example, referring to FIG. 1, the request for monitoring may be received from customer computer 102 and may relate to monitoring one or more of VM instances 116A, 116B.

Operation 404 depicts receiving TCP connection state information relating to network traffic. The network traffic may comprise communication between two or more computing nodes. As an example, the network traffic may be over one or more network connections. As another example, the network traffic may comprise operational parameters of one or more computing nodes and/or or the underlying protocol. As a further example, the network traffic may comprise web browsing, email, VoIP, streaming video, application layer to database communication, and/or database server to storage fabric communication. TCP connection state information may comprise state information and may be received via a connection tracking module. In an example embodiment, referring to FIG. 1, monitors 109 may be implemented as a module that runs on instance manager 119 (e.g., hypervisor or Dom0). When a VM instance 116A, 116B sends or receives a data packet, the packet may be accessed by monitors 109 and transmitted to health manager 108 for analysis. In an embodiment, monitors 109 may parse the packet and create a digest identifying the above information.

Operation 406 depicts analyzing the TCP connection state information to determine a network health condition. The network health condition may be determined by detecting at least one of an advertised window below a predetermined threshold, a detection of a retransmit over a network connection, and a number of retransmits over a network connection exceeding a predetermined threshold. In an example embodiment, referring to FIG. 1, health manager 108 may receive and process the TCP connection state information, an identifier of the instance, a machine image identifier, instance type identifier, host identifier, and the like. Health manager 108 may be configured to analyze the TCP connection state information across various aggregate dimensions, including per customer, per rack, per instance, per instance type, and the like.

Determining the network health condition may include identifying patterns in TCP connection state information relating to multiple computing nodes such as a distribution of virtual instances. In an example embodiment, referring to FIG. 1, health manager 108 may process TCP connection state information over a period of time and may compare TCP connection state information received from various sources to identify a pattern of network traffic that represents a particular network health condition. As an example, multiple virtual instances hosted across various servers may experience a sharp reduction in advertised window size. Such a widespread pattern may be represented as the network health condition. Machine learning algorithms may be trained and tested on TCP connection state information received via health manager 108 to generate predictors associated with certain classifications of data such as fault conditions (e.g., application fault condition, transport fault condition, etc.). As such, the trained machine learning algorithm may be configured to classify subsequently received data based on the predictors to identify normal conditions and/or fault conditions represented by the subsequently received data.

Operation 407 depicts determining a location of a source of the network health condition in the service provider network based at least on the topology of the service provider network. For example, referring to FIG. 1, health manager 108 may access or receive information representing the network topology of service provider environment 150 and monitors 109. Network topology information may include an identifier of one or more instances, a network device identifier, host identifier, and/or a mapping of virtual instances and the servers hosting such instance. Using such network topology information, health manager 108 may determine which instance, server, router, switch, and/or rack is the source of information representing the network health condition.

In a specific example, once TCP connection state information indicates a network condition, health manager 108 can access topology information to identify the set of nodes associated with the transmission of the packets showing a network condition. This could include identifying the server the instance is hosted on, the top of rack switch the server is connected to, the devices the packets leaving the instance travel within the service provider environment, and, in the situation where the destination is also within the service provider environment 150, the top of rack switch and server associated with the destination, for example. Next, health manager 108 may collect TCP connection state information from each of these nodes in the identified set. In some embodiments, such information may already be collected, but in other embodiments this may include sending requests to relevant monitors for the set of nodes to obtain the information. Health manager 108 may then analyze the TCP connection state information for the set of nodes to determine if any of the information also shows a network condition. In the event that one or more nodes also have the network condition, health manager 108 may identify a possible node that is the cause of the network condition. Alternatively, if no other nodes have the network condition then health manager 108 can classify the network condition as possibly attributed to a customer's instance. In an embodiment, the health manager 108 may obtain a list of the customer's instances that are similar to the impacted instance (e.g., same machine image identifier, same instance type, same customer tags, etc.) and determine whether any of these instances seem to have the same problem.

Operation 408 depicts classifying the network health condition based on one or more condition types. Based on analysis of TCP connection state information relating to various computing nodes and/or information relating to network topology, the network health condition may be classified into one or more condition types, such as, application fault condition, transport fault condition, path MTU discovery, and/or application layer overload, for example. The TCP connection state information may be classified based on varying scales, such as, per-host, per-connection, per-path, and/or per-link, for example. Contextual information such as source address, destination address, round-triptime, and other network (packet) information may be used in analyzing and/or classifying TCP connection state information.

In an example embodiment, referring to FIG. 1, health manager 108 may be configured to classify the received information based on preset rules or identifiers associated with preset categories of information. Health manager 108 may receive physical network health information based on methods disclosed in U.S. Pat. No. 8,661,295. As a further example, the TCP connection state information may be processed by health manager 108 along with node health information, such as occupancy of the instance, an instance size, a processing utilization, and/or a processing load, to determine whether a fault is network related (e.g., transport fault) or application related (e.g., application fault). The network health condition may be caused by a path fault, whereby information relating the physical network may delineate issues related to application faults or issues with the operation of the end-node. Likewise, physical network health may provide insight to an operational link or path and additional information on the end-node may allow a diagnosis of a malfunctioning instance, for example. As such, health manager 108 may process TCP connection state information received from monitors 109, physical health information received via network health services of the service provider network, and/or node health information received from the network devices. Health manager 108 may be configured to process this aggregate information to make network-level determinations of faults. Such determination may be based on preset identifier, classifiers, and rules or via machine learning predictors that have been established via historical data processing, for example.

Operation 410 depicts providing (e.g., transmitting, presenting, etc.) information representing the determined network health condition. The information may be provided via an interface such as an API. As an example, the information may be presented in substantially real-time to facilitate diagnosis of a network fault, for example, over one or more network connections. The classified network health condition may be provided to at least one interface of a plurality of interfaces based at least in part on the classified type of condition. As an example, an API may be leveraged to open a socket (e.g., interface) and provide a handler when an advertised windows size falls below a predetermined threshold (e.g., 100 KB). As a further example, a handler may be established when a retransmit is detected on a particular connection. This interfacing with TCP connection state information facilitates improved reasoning to disambiguate between network conditions such as a path fault vs. an application fault. The TCP connection state information may be used with long lived connections, whereby a decreased window size may be detected and a different connection may be established in response to the decreased window. The operating procedures of FIG. 4 may end at 412.

FIGS. 5-7 further illustrate example operating environments at varying levels of granularity in which aspects of the techniques disclosed herein may be implemented. FIG. 5 generally illustrates a service provider environment that comprises a plurality of datacenters. FIG. 6 generally illustrates a datacenter that comprises a plurality of computing nodes. FIG. 7 generally illustrates a computing device that may be deployed in connection with a datacenter. Any of the devices, computers, servers, and/or instance may be considered computing nodes, as used herein.

It may be appreciated that the operating environments of FIGS. 5-7 may be used to implement aspects of the operating environment of FIG. 1. For example, service provider environment 150 and its components may be implemented in service provider environment 508 of FIG. 5. Likewise, network 104 of FIG. 1 may be wide area network 506 of FIG. 5, physical host computer 106, node manager 107, health manager 108, may each be customer computing system 504 of FIG. 5 and/or computing device 700 of FIG. 7.

Turning now to details of FIG. 5, this figure depicts an example of a suitable computing environment in which aspects described herein may be implemented. A service provider (such as service provider environment 508) may configure the illustrated computing environment to host virtual private networks of entities and to enable communication paths between these virtual private networks that may otherwise be isolated. In particular, FIG. 5 illustrates a system and network diagram that shows an example operating environment 500 that includes a service provider environment 508 for implementing virtual private networks and for providing access to compute resources, such as virtual machine instances. Service provider environment 508 may provide compute resources for executing applications on a permanent or an as-needed basis and may be configured as a private network. These compute resources may include various types of resources, such as data processing resources, data storage resources, data communication resources, and the like. Each type of compute resource may be general-purpose or may be available in a number of specific configurations. For example, data processing resources may be available as virtual machine instances. The instances may be configured to execute applications, including web servers, application servers, media servers, database servers, and the like. Data storage resources may include file storage devices, block storage devices, and the like.

Each type or configuration of compute resource may be available in different sizes, such as large resources consisting of many processors, large amounts of memory, and/or large storage capacity, and small resources consisting of fewer processors, smaller amounts of memory, and/or smaller storage capacity. Entities may choose to allocate a number of small processing resources as web servers and/or one large processing resource as a database server, for example.

The compute resources provided by service provider environment 508 may be enabled by at least one datacenters 502A-502N, which may be referred herein singularly as "datacenter 502" or in the plural as "datacenters 502." Datacenters 502 may be facilities that house and operate computer systems and associated components and may include redundant and backup power, communications, cooling, and security systems. Datacenters 502 may be located in a same geographical area, such as in a same facility, and may be interconnected using private networks, such as high-speed fiber optic networks, controlled and managed by a service provider of service provider environment 508. Datacenters 502 may also be distributed across geographically disparate locations and may be interconnected in part using public networks, such as the Internet. One illustrative configuration for datacenter 502 that implements the concepts and technologies disclosed herein is described below with regard to FIG. 5.

Entities of service provider environment 508 may access the compute resources (e.g., computing nodes) provided by datacenters 502 over a wide area network (WAN) 506. Although a WAN is illustrated in FIG. 5, it should be appreciated that a local area network (LAN), the Internet, or any other networking topology known in the art that connects datacenters 502 to remote entities and other users may be utilized. It should also be appreciated that combinations of such networks may also be utilized.

An entity or other entities that are customers of service provider environment 508 may utilize a customer computing system 504 to access the compute resources provided by datacenters 502. Customer computing system 504 comprises a computer capable of accessing service provider environment 508, such as a server computer, a desktop or laptop personal computer, a tablet computer, a wireless telephone, a PDA, an e-reader, a game console, a set-top box, or any other computing node.

As is described in greater detail below, customer computing system 504 may be utilized to configure aspects of the compute resources provided by service provider environment 508. In this regard, service provider environment 508 may provide a web interface through which aspects of its operation may be configured through the use of a web browser application program executing on customer computing system 504. Alternatively, a stand-alone application program executing on customer computing system 504 may access an application programming interface (API) (not shown) exposed by service provider environment 508 for performing the configuration operations. Other mechanisms for configuring the operation of service provider environment 508, including launching new virtual machine instances on service provider environment 508, may also be utilized.

According to aspects disclosed herein, capacities of purchased compute resources provided by service provider environment 508 may be scaled in response to demand. In this regard, scaling refers to the process of instantiating, which may also be referred to herein as "launching" or "creating," or terminating, which may also be referred to herein as "de-scaling," instances of compute resources in response to demand.

Service provider environment 508 may also be configured with a deployment component to assist entities in the deployment of new instances of compute resources. The deployment component may receive a configuration from an entity that may include data describing how new instances should be configured. For example, the configuration may specify at least one applications or software components that should be installed in new instances provide scripts and/or other types of code to be executed in new instances, provide cache warming logic specifying how an application cache should be prepared, and other types of information. The deployment component utilizes the entity-provided configuration and cache warming logic to launch, configure, and prime new instances of compute resources.

FIG. 6 is a diagram depicting an example of a distributed computing environment on which aspects of the present invention may be practiced. Various users 600*a* may interact with various client applications, operating on any type of computing device 602*a*, to communicate over communications network 604 with processes executing on various computing nodes 610*a*, 610*b*, and 610*c* (e.g., computing nodes) within a data center 620. Alternatively, client applications 602*b* may communicate without user intervention. Communications network 604 may comprise any combination of communications technology, including the Internet, wired and wireless local area networks, fiber optic networks, satellite communications, and so forth. Any number of networking protocols may be employed.

Communication with processes executing on the computing nodes 610*a*, 610*b*, and 610*c*, operating within data center 620 (which may be similar in datacenter 502), may be provided via gateway 606 and router 608. Numerous other network configurations may also be employed. Although not explicitly depicted in FIG. 6, various authentication mechanisms, web service layers, business objects or other intermediate layers may be provided to mediate communication with the processes executing on computing nodes 610*a*, 610*b*, and 610*c*. Some of these intermediate layers may themselves comprise processes executing on one or more of the computing nodes. Computing nodes 610*a*, 610*b*, and 610*c*, and processes executing thereon, may also communicate with each other via router 608. Alternatively, separate communication paths may be employed. In some embodiments, data center 620 may be configured to communicate with additional data centers, such that the computing nodes and processes executing thereon may communicate with computing nodes and processes operating within other data centers.

Computing node 610*a* is depicted as residing on physical hardware comprising one or more processors 616, one or more memories 618 and one or more storage devices 614. Processes on computing node 610*a* may execute in conjunction with an operating system or alternatively may execute as a bare-metal process that directly interacts with physical resources, such as processors 616, memories 618, or storage devices 614.

Computing nodes 610*b* and 610*c* are depicted as operating on virtual machine host 612, which may provide shared access to various physical resources, such as physical processors, memory and storage devices. Any number of virtualization mechanisms might be employed to host the computing nodes.

The various computing nodes depicted in FIG. 6 may be configured to host web services, database management systems, business objects, monitoring and diagnostic facilities, and so forth. The computing nodes may be or comprise computing nodes. Computing nodes may be services or compute processes executing via one or more computing nodes. A computing node may refer to various types of computing resources, such as personal computers, servers, clustered computing devices, and so forth. A computing node may, for example, refer to various computing devices, such as cell phones, smartphones, tablets, embedded device and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs. The computing nodes may be configured in a particular logical topology. Such topology information and other network infrastructure information may be made available via advertisement and/or via monitor 109.

In at least some embodiments, a server that implements a portion or all of one or more of the technologies described herein may include a general-purpose computer system that includes or is configured to access one or more computer-accessible media.

FIG. 7 depicts a general-purpose computer system that includes or is configured to access one or more computer-accessible media. In the illustrated embodiment, computing device 700 includes one or more processors 710a, 710b, and/or 710n (which may be referred herein singularly as a processor 710 or in the plural as the processors 710) coupled to a system memory 720 via an input/output (I/O) interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processor(s) 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

In some embodiments, a graphics processing unit ("GPU") 712 may participate in providing graphics rendering and/or physics processing capabilities. A GPU may, for example, comprise a highly parallelized processor architecture specialized for graphical computations. In some embodiments, processors 710 and GPU 712 may be implemented as one or more of the same type of device.

System memory 720 may be configured to store instructions and data accessible by processor(s) 710. In various embodiments, system memory 720 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques and data described above, are shown stored within system memory 720 as code 725 and data 726.

In one embodiment, I/O interface 730 may be configured to coordinate I/O traffic between processor(s) 710, system memory 720 and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 620, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 740 may support communication via telecommunications/telephony networks, such as analog voice networks or digital fiber communications networks, via storage area networks, such as Fibre Channel SANs (storage area networks), or via any other suitable type of network and/or protocol. Connection states may be exposed via one or more monitors 109, as described herein.

In some embodiments, system memory 720 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 700 as system memory 720 or another type of memory. Further, a computer-accessible medium may include transmission media or signals, such as electrical, electromagnetic or digital signals, conveyed via a communication medium, such as a network and/or a wireless link, such as those that may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on), and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may comprise any combination of hardware or software that may interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some aspects be combined in fewer modules or distributed in additional modules. Similarly, the functionality of some of the illustrated modules may not be provided and/or other additional functionality may be available.

Each of the operations, processes, methods, and algorithms described in the preceding sections may be embodied in, and fully or partially automated by, code modules executed by at least one computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example aspects. The example systems and components described herein may be configured differently than described. For example, elements may be added to, removed from, or rearranged compared to the disclosed example aspects.

It will also be appreciated that various items are illustrated as being stored in memory or on storage while being used, and that these items or portions of thereof may be transferred between memory and other storage devices for purposes of memory management and data integrity. Alternatively, some or all of the software modules and/or systems may execute in memory on another device and communicate with the illustrated computing systems via inter-computer communication. Furthermore, some or all of the systems and/or modules may be implemented or provided in other ways, such as at least partially in firmware and/or hardware, including, but not limited to, at least one application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other aspects. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain aspects include, while other aspects do not include, certain features, elements, and/or steps. Thus, such conditional language is not generally intended to imply that features, elements, and/or steps are in any way required for at least one aspects or that at least one aspects necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example aspects have been described, these aspects have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method comprising:
receiving a request to monitor a first virtual machine running on a server, the server running within a service provider network;
receiving first TCP connection state information from an instance manager hosting the first virtual machine, the first TCP connection state information relating to connections of the first virtual machine;
analyzing the first TCP connection state information to identify one or more first indicators of network health condition in the service provider network, the analyzing including searching the first TCP connection state information for packet retransmissions, reductions in advertised window size, and out-of-order packets; and
after identifying the one or more first indicators, causing information representing the identified one or more first indicators to be sent to a customer associated with the virtual machine.

2. The computer-implemented method of claim 1, further comprising:
receiving second TCP connection state information relating to connections of a second virtual machine;
comparing the first TCP connection state information relating to connections of the first virtual machine to the second TCP connection state information relating to connections of the second virtual machine; and
classifying the network health condition in the service provider network as an application fault or a transport fault based at least upon the comparing of the first TCP connection state information relating to connections of the first virtual machine to the second TCP connection state information relating to connections of the second virtual machine.

3. The computer-implemented method of claim 1, further comprising:
receiving second TCP connection state information relating to connections of a second virtual machine;
analyzing the second TCP connection state information to identify one or more second indicators of network health conditions in the service provider network;
comparing the identified one or more first indicators with the identified one or more second indicators; and
classifying the network health condition in the service provider network as an application fault or a transport fault based at least upon the comparing the identified one or more first indicators with the identified one or more second indicators.

4. A system for exposing network health, the system comprising:
one or more computing nodes;
one or more monitors executing via the one or more computing nodes to process network information relating to network traffic over a network connection of a service provider network; and
a health manager in communication with the one or more monitors, the health manager executing via the one or more computing nodes at least to:
receive at least the network information and information relating to a topology of the service provider network,
analyze the network information to determine a pattern in the network traffic that is indicative of a network health condition, and
determine a location of a source of the network health condition in the service provider network based at least on the topology of the service provider network.

5. The system of claim 4, wherein the network information comprises at least one of advertised window information, retransmission information, packet order information, an advertised window below a predetermined threshold, a detection of a retransmit over the network connection, or a number of retransmits over the network connection exceeding a predetermined threshold.

6. The system of claim 4, wherein the network information is aggregated across one or more of: per customer, per rack, per server, per instance, and per instance type.

7. The system of claim 4, wherein the information relating to the topology of the network comprises one or more of an instance identifier, a network device identifier, and a host identifier.

8. The system of claim 4, wherein the health manager determines the pattern by comparing network traffic over a plurality of network connections in the service provider network.

9. The system of claim 4, wherein the health manager is further configured to remediate the network health condition by one or more of: causing the network traffic to be throttled, cause the network traffic to be blocked, transmitting a notification, causing a traffic to be redirected within the service provider network, or causing scaling of a resource of the service provider network.

10. The system of claim 4, wherein the health manager is further configured to cause information representing the network health condition to be presented via an application programming interface.

11. The system of claim 4, wherein the health manager is further configured to selectively enable and disable the one or more monitors to process the network information based upon one or more of a customer request and a policy of the service provider network.

12. The system of claim 4, wherein the health manager is further configured to randomly enable and disable the one or more monitors to process the network information.

13. The system of claim 4, wherein the one or more monitors are executing in a virtualization system hosting one or more virtual machines of the service provider network.

14. A non-transitory computer-readable storage medium having stored thereon instructions that, upon execution by one or more computing nodes, cause the one or more computing nodes at least to:
    receive first network information relating to a connection of a first computing node in a service provider network;
    analyze the first network information to determine a first network health condition;
    receive second network information relating to a connection of a second computing node in the service provider network;
    analyze the second network information to determine a second network health condition; and
    classify one or more of the first network health condition and the second network health condition into one or more condition types based on a comparison of the first network health condition and the second network health condition.

15. The non-transitory computer-readable storage medium of claim 14, wherein the network information comprises at least one of advertised window information, retransmission information, packet order information, an advertised window below a predetermined threshold, a detection of a retransmit, and a number of retransmits exceeding a predetermined threshold.

16. The non-transitory computer-readable storage medium of claim 14, wherein one or more of the first network health condition and the second network health condition is determined by detecting at least one of an advertised window below a predetermined threshold and a number of retransmits exceeding a predetermined threshold.

17. The non-transitory computer-readable storage medium of claim 14, wherein the one or more condition types comprise at least one of an application fault and a transport fault.

18. The non-transitory computer-readable storage medium of claim 14, further comprising instructions that, upon execution by the one or more computing nodes, cause the one or more computing nodes at least to remediate the network health condition by one or more of: causing the network traffic to be throttled, cause the network traffic to be blocked, transmitting a notification, causing a traffic to be redirected within the service provider network, or causing scaling of a resource of the service provider network.

19. The non-transitory computer-readable storage medium of claim 14, wherein the plurality of interfaces comprise an application programming interface.

20. The non-transitory computer-readable storage medium of claim 14, wherein one or more of the first network health condition and the second network health condition is classified as an application fault and information representing the application fault is presented to a customer associated with a source of the application fault.

* * * * *